United States Patent
Karmarkar

(10) Patent No.: US 8,509,827 B2
(45) Date of Patent: Aug. 13, 2013

(54) METHODS AND APPARATUS OF CONTEXT-DATA ACQUISITION AND RANKING

(75) Inventor: Amit Karmarkar, Palo Alto, CA (US)

(73) Assignee: Buckyball Mobile Inc., Palo Alto, CA (US)

( * ) Notice: Subject to any disclaimer, the term of this patent is extended or adjusted under 35 U.S.C. 154(b) by 187 days.

(21) Appl. No.: 12/855,636

(22) Filed: Aug. 12, 2010

(65) Prior Publication Data

US 2010/0323730 A1    Dec. 23, 2010

Related U.S. Application Data

(63) Continuation-in-part of application No. 12/422,313, filed on Apr. 13, 2009, which is a continuation-in-part of application No. 11/519,600, filed on Sep. 11, 2006, now Pat. No. 7,551,935, which is a continuation-in-part of application No. 11/231,575, filed on Sep. 21, 2005, now Pat. No. 7,580,719.

(60) Provisional application No. 61/161,763, filed on Mar. 19, 2009.

(51) Int. Cl.
    *H04W 4/14* (2009.01)
(52) U.S. Cl.
    USPC ........... 455/466; 370/328; 370/349; 370/496; 370/522
(58) Field of Classification Search
    USPC ........... 455/466; 426/576, 443, 92; 424/456; 514/17, 18, 19
    See application file for complete search history.

(56) References Cited

U.S. PATENT DOCUMENTS

| | | | |
|---|---|---|---|
| 4,959,785 A | 9/1990 | Yamamoto et al. | |
| 5,493,692 A | 2/1996 | Theimer et al. | |
| 5,517,409 A | 5/1996 | Ozawa et al. | |
| 5,797,098 A | 8/1998 | Schroeder et al. | |
| 6,473,621 B1 | 10/2002 | Heie | |
| 6,560,456 B1 | 5/2003 | Lohtia et al. | |
| 6,611,755 B1 * | 8/2003 | Coffee et al. | 701/213 |
| 6,731,940 B1 | 5/2004 | Nagendran | |

(Continued)

FOREIGN PATENT DOCUMENTS

WO    WO-2007104487    9/2007

OTHER PUBLICATIONS

U.S. Appl. No. 11/742,242, filed Apr. 30, 2007, Maloney, David.

(Continued)

*Primary Examiner* — Lester Kincaid
*Assistant Examiner* — Diego Herrera

(57) ABSTRACT

Disclosed are a system, method, and article of manufacture of a context-data acquisition and ranking. A context-data type is determined from a query. At least one context-data source that provides the context-data type is identified. A request for a context data of the context-data type is generated from the at least one context data source. A received context data from the at least one context data source according a specified parameter may be ranked. The received context data may be provided to the device that generated a short message. The received context data may be provided to a recipient mobile device. The received context data may be associated with a component of a short message generated by a device that generated the query. The received context data may be appended to the short message.

26 Claims, 8 Drawing Sheets

(56) References Cited

U.S. PATENT DOCUMENTS

| | | |
|---|---|---|
| 6,750,883 B1 | 6/2004 | Parupudi et al. |
| 6,785,869 B1 | 8/2004 | Berstis |
| 6,813,507 B1 | 11/2004 | Gress et al. |
| 6,816,578 B1 | 11/2004 | Kredo et al. |
| 6,898,518 B2 | 5/2005 | Padmanabhan |
| 6,963,839 B1 | 11/2005 | Ostermann et al. |
| 6,964,020 B1 | 11/2005 | Lundy |
| 6,966,035 B1 | 11/2005 | Suess et al. |
| 6,990,180 B2 | 1/2006 | Vuori |
| 6,993,553 B2 | 1/2006 | Kaneko et al. |
| 7,072,956 B2 | 7/2006 | Parupudi et al. |
| 7,177,902 B2 | 2/2007 | Hubbard |
| 7,181,387 B2 | 2/2007 | Ju et al. |
| 7,207,004 B1 | 4/2007 | Harrity |
| 7,254,773 B2 | 8/2007 | Bates et al. |
| 7,272,406 B2 | 9/2007 | Chava et al. |
| 7,293,074 B1 | 11/2007 | Jellinek et al. |
| 7,305,230 B2 | 12/2007 | Zhigang |
| 7,315,902 B2 | 1/2008 | Kirkland |
| 7,359,714 B2 | 4/2008 | Parupudi et al. |
| 7,363,357 B2 | 4/2008 | Parupudi et al. |
| 7,366,500 B1 | 4/2008 | Yalovsky et al. |
| 7,424,682 B1 | 9/2008 | Pupius et al. |
| 7,551,935 B2 | 6/2009 | Karmarkar |
| 7,580,719 B2 | 8/2009 | Karmarkar |
| 7,738,912 B1* | 6/2010 | Hawkins et al. ............ 455/550.1 |
| 7,742,774 B2* | 6/2010 | Oh et al. .................... 455/456.1 |
| 7,869,796 B2* | 1/2011 | Lee et al. ................... 455/412.2 |
| 2002/0077135 A1 | 6/2002 | Hyon |
| 2002/0173294 A1 | 11/2002 | Nemeth et al. |
| 2002/0187794 A1 | 12/2002 | Fostick et al. |
| 2002/0193996 A1 | 12/2002 | Squibbs et al. |
| 2002/0198715 A1 | 12/2002 | Belrose |
| 2003/0023424 A1 | 1/2003 | Weiner |
| 2003/0078033 A1 | 4/2003 | Sauer et al. |
| 2003/0085989 A1 | 5/2003 | Tay |
| 2003/0125927 A1 | 7/2003 | Seme |
| 2003/0144895 A1 | 7/2003 | Aksu et al. |
| 2003/0186716 A1 | 10/2003 | Dorenbosch et al. |
| 2003/0207701 A1 | 11/2003 | Rolnik et al. |
| 2003/0236658 A1 | 12/2003 | Yam |
| 2004/0024683 A1 | 2/2004 | Morciniec et al. |
| 2004/0034561 A1 | 2/2004 | Smith |
| 2004/0044517 A1 | 3/2004 | Palmquist |
| 2004/0092272 A1 | 5/2004 | Valloppillil |
| 2004/0102201 A1 | 5/2004 | Levin |
| 2004/0102956 A1 | 5/2004 | Levin |
| 2004/0110493 A1 | 6/2004 | Alvarez et al. |
| 2004/0122735 A1* | 6/2004 | Meshkin ........................ 705/14 |
| 2004/0122979 A1 | 6/2004 | Kirkland |
| 2004/0158471 A1 | 8/2004 | Davis et al. |
| 2004/0179545 A1 | 9/2004 | Erola et al. |
| 2004/0194141 A1 | 9/2004 | Sanders |
| 2004/0215526 A1 | 10/2004 | Luo et al. |
| 2004/0221256 A1 | 11/2004 | Martin et al. |
| 2004/0221260 A1 | 11/2004 | Martin et al. |
| 2004/0235503 A1 | 11/2004 | Koponen et al. |
| 2004/0248591 A1 | 12/2004 | Fish |
| 2004/0253963 A1 | 12/2004 | Park et al. |
| 2004/0266462 A1 | 12/2004 | Chava et al. |
| 2005/0003837 A1 | 1/2005 | Midkiff et al. |
| 2005/0004840 A1 | 1/2005 | Wanninger |
| 2005/0027608 A1* | 2/2005 | Wiesmuller et al. ............ 705/26 |
| 2005/0038892 A1 | 2/2005 | Huang et al. |
| 2005/0066044 A1 | 3/2005 | Chaskar et al. |
| 2005/0128967 A1 | 6/2005 | Scobbie |
| 2005/0136994 A1* | 6/2005 | Bahl et al. .................... 455/574 |
| 2005/0171944 A1 | 8/2005 | Palmquist |
| 2005/0184875 A1* | 8/2005 | Schmandt et al. ......... 340/573.1 |
| 2005/0188273 A1* | 8/2005 | Angelo et al. .................. 714/39 |
| 2005/0191963 A1 | 9/2005 | Hymes |
| 2005/0198304 A1 | 9/2005 | Oliver et al. |
| 2005/0221820 A1* | 10/2005 | Ruetschi .................... 455/432.3 |
| 2005/0245241 A1* | 11/2005 | Durand et al. ............. 455/414.1 |
| 2005/0267749 A1 | 12/2005 | Yamada et al. |
| 2006/0019724 A1* | 1/2006 | Bahl et al. .................... 455/574 |
| 2006/0123053 A1* | 6/2006 | Scannell, Jr. ............... 707/104.1 |
| 2006/0135181 A1 | 6/2006 | Dale et al. |
| 2006/0167992 A1 | 7/2006 | Cheung et al. |
| 2006/0212621 A1 | 9/2006 | Ash et al. |
| 2006/0223518 A1* | 10/2006 | Haney ........................... 455/420 |
| 2007/0027673 A1 | 2/2007 | Moberg |
| 2007/0032244 A1* | 2/2007 | Counts et al. .............. 455/456.1 |
| 2007/0076877 A1 | 4/2007 | Camp et al. |
| 2007/0130170 A1 | 6/2007 | Forney |
| 2007/0197229 A1* | 8/2007 | Kalliola et al. ............ 455/456.1 |
| 2007/0208813 A1 | 9/2007 | Blagsvedt et al. |
| 2007/0254593 A1* | 11/2007 | Jollota et al. ............... 455/67.11 |
| 2008/0005068 A1 | 1/2008 | Dumais et al. |
| 2008/0025482 A1 | 1/2008 | Susama et al. |
| 2008/0043718 A1 | 2/2008 | Chu |
| 2008/0059152 A1 | 3/2008 | Fridman et al. |
| 2008/0076409 A1 | 3/2008 | Hinrikus et al. |
| 2008/0133228 A1 | 6/2008 | Rao |
| 2008/0133336 A1 | 6/2008 | Altman et al. |
| 2008/0243619 A1 | 10/2008 | Sharman et al. |
| 2008/0311934 A1 | 12/2008 | Soderstrom |
| 2009/0055739 A1 | 2/2009 | Murillo et al. |
| 2009/0082042 A1 | 3/2009 | Harendra et al. |
| 2009/0124272 A1 | 5/2009 | White et al. |
| 2009/0129372 A1 | 5/2009 | Pandey et al. |
| 2009/0147778 A1 | 6/2009 | Wanless et al. |
| 2009/0163183 A1 | 6/2009 | O'Donoghue et al. |
| 2009/0175499 A1 | 7/2009 | Rosenblatt |
| 2009/0254529 A1 | 10/2009 | Goldentouch |
| 2009/0282030 A1 | 11/2009 | Abbot et al. |
| 2010/0048290 A1 | 2/2010 | Baseley et al. |

OTHER PUBLICATIONS

"About ContractBuddy"; http://www,contractbuddy.com/aboutCB/features. htm.

"Electronic negotiations, media, and transactions in socioeconomic interactions"; YUAN; http://intemeg.org!enegotiationlresourceslonline_info,html.

"Distributed PeCo-Mediator: Finding Partners via Personal Connections" Ogata etal.

"What Can Computer Programs Do to Facilitate Negotiation Processes?"; Chaudhury. et al.; 1991 ACM 0-89791-456-2/91/0010/0269.

"Speech Centric Multimodal Interfaces for Mobile Communication Systems"; Kvale et al.; Teiektronikk Feb. 2003; p. 104-117.

"DUMAS—Adaptation and Robust Information Processing for Mobile Speech Interfaces"; Jokinen et al.

"Google SMS: How to Use"; http://www.google.com/smslhowtouse.html.

Author(s) unknown, Voice SMS—Client & Clientless Solutions Fun Talk SMS, V2V SMS, VoiceSMSData Sheet 1,publication date unknown (copyright 2008), published by Movius.

Yasuto Nakanishi et al "Context Aware Messaging Service:A Dynamic Messaging Delivery Using Location Information and Schedule Information," Personal Technologies (2000)Abstract.

* cited by examiner

METHODS AND APPARATUS OF CONTEXT-DATA ACQUISITION AND RANKING

CLAIM OF PRIORITY

This application is a continuation-in-part of and claims priority to patent application Ser. No. 12/422,313 filed on Apr. 13, 2009 which claims priority from provisional application 61/161,763 filed on Mar. 19, 2009, patent application Ser. No. 12/422,313 is a continuation-in-part of Ser. No. 11/519,600 filed Sep. 11, 2006, which was patented as U.S. Pat. No. 7,551,935, which is a continuation-in-part of Ser. No. 11/231,575 filed Sep. 21, 2005 which was patented as U.S. Pat. No. 7,580,719.

FIELD OF TECHNOLOGY

This disclosure relates generally to a short-message communication system, and, more particularly, to a system, methods and an article of manufacture of context-data acquisition and ranking.

BACKGROUND

Various forms of short messaging are currently used to communicate with mobile devices. For example, Short Message Service (SMS) messaging is a form of communication supported by most mobile telephone service providers and widely available on various networks including Global System for Mobile Communications (GSM), Code Division Multiple Access (CDMA), Time Division Multiple Access (TDMA), third generation (3G) networks, and fourth generation (4G) networks. Versions of SMS messaging are described in GSM specifications such as GSM specification 03.40 "Digital cellular telecommunications system (Phase 2+); Technical realization of the Short Message Service" and GSM specification 03.38 "Digital cellular telecommunication system (Phase 2+); Alphabets and language-specific information."

In general, SMS messages from a sender terminal are transmitted to a Short Message Service Center (SMSC), which provides a store-and-forward mechanism for delivering the SMS message to one or more recipient terminals. Successful SMS message arrival may be announced by a vibration and/or a visual indication at the recipient terminal. In some cases, the SMS message may typically contain an SMS header including the message source (e.g., telephone number, message center, or e-mail address) and a payload containing the text portion of the message. Generally, the payload of each SMS message is limited by the supporting network infrastructure and communication protocol to no more than 140 bytes which translates to 160 7-bit characters based on a default 128-character set defined in GSM specification 03.38, 140 8-bit characters, or 70 16-bit characters for languages such as Arabic, Chinese, Japanese, Korean, and other double-byte languages.

Due to payload limitations, a long message having more than 140 bytes or 160 7-bit characters may be delivered as separate SMS messages. In some cases, the SMS infrastructure may support concatenation allowing a long message to be sent and received as multiple concatenated SMS messages. In such cases, the payload of each concatenated SMS message is limited to 140 bytes but also includes a user data header (UDH) prior to the text portion of the message. The UDH contains segmentation information for allowing the recipient terminal to reassemble the multiple concatenated SMS messages into a single long message. In addition to alphanumeric characters, the text content of an SMS message may contain iconic characters (e.g. smiley characters) made up of a combination of standard punctuation marks such as a colon, dash, and open bracket for a smile.

Enhanced Messaging Service (EMS) is an application level extension to SMS described in the 3rd Generation Partnership Project (3GPP) Technical Specification (TS) 23.040 V6.7.0 (2006-03), "Technical realization of the Short Message Service." EMS extends the use of the UDH to include binary data which allows EMS-enabled terminals to send and receive text messages having simple media content such as text formatting, predefined icons, pictures, and sounds. EMS messaging is supported by the SMS infrastructure and constrained by SMS payload limits. As such, several concatenated short messages are typically required for EMS messaging since usually only one picture or sound can be sent in a single short message. If an EMS message is received by a non-enabled terminal, unreadable data will be overwritten and the message will be displayed as a normal SMS message.

Multimedia Messaging (MMS) technology provides capabilities beyond those of SMS and allows terminals to send and receive multimedia messages including graphics, video and audio clips. Unlike SMS, which depends primarily on the underlying wireless network technology (e.g. GSM, CDMA, TDMA), MMS relies on Internet Protocol (IP) technology and is designed to work with mobile packet data services such as General Packet Radio Service (GPRS) and Evolution Data Only/Evolution Data Optimized (EV-DO).

A mobile device may include a short messaging application such as SMS, EMS, MMS and the like. A user may compose and send short messages with the short messaging application. Portions of the short messages may be related to a mobile device's context such as its physical environment. Knowledge of this context may be useful to a receiver when reviewing the short message. For example, without the context data, the receiver may not understand ambiguities in the short message. The receiver may need to query the sending user with additional questions (e.g. other text messages, cell phone calls, etc.) to clarify the meaning of the short message. Accordingly, there may be a need to enrich a short message with context data.

SUMMARY

A system, methods, and article of manufacture of context-data acquisition and ranking. In one aspect, a context-data type is determined from a query. At least one context-data source that provides the context-data type is identified. A request for a context data of the context-data type is generated from the at least one context data source. A received context data from the at least one context data source may be ranked according a specified parameter. The received context data may be provided to the device that generated a short message. The received context data may be provided to a recipient mobile device. The received context data may be associated with a component of a short message generated by a device that generated the query. The received context data may be appended to the short message.

In another aspect, a set of context-data is collected from at least one context-data provider. The context-data is related to a short message content. A relevant context data is selected according to a metric. The relevant context data is linked to the short message. The relevant context data and the short message are formatted according to a communication protocol.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a system, methods, and article of manufacture of context data acquisition and ranking. Although the present embodiments have been described with reference to specific example embodiments, it will be evident that various modifications and changes can be made to these embodiments without departing from the broader spirit and scope of the various claims.

A. Environment And Architecture

Figure 1:
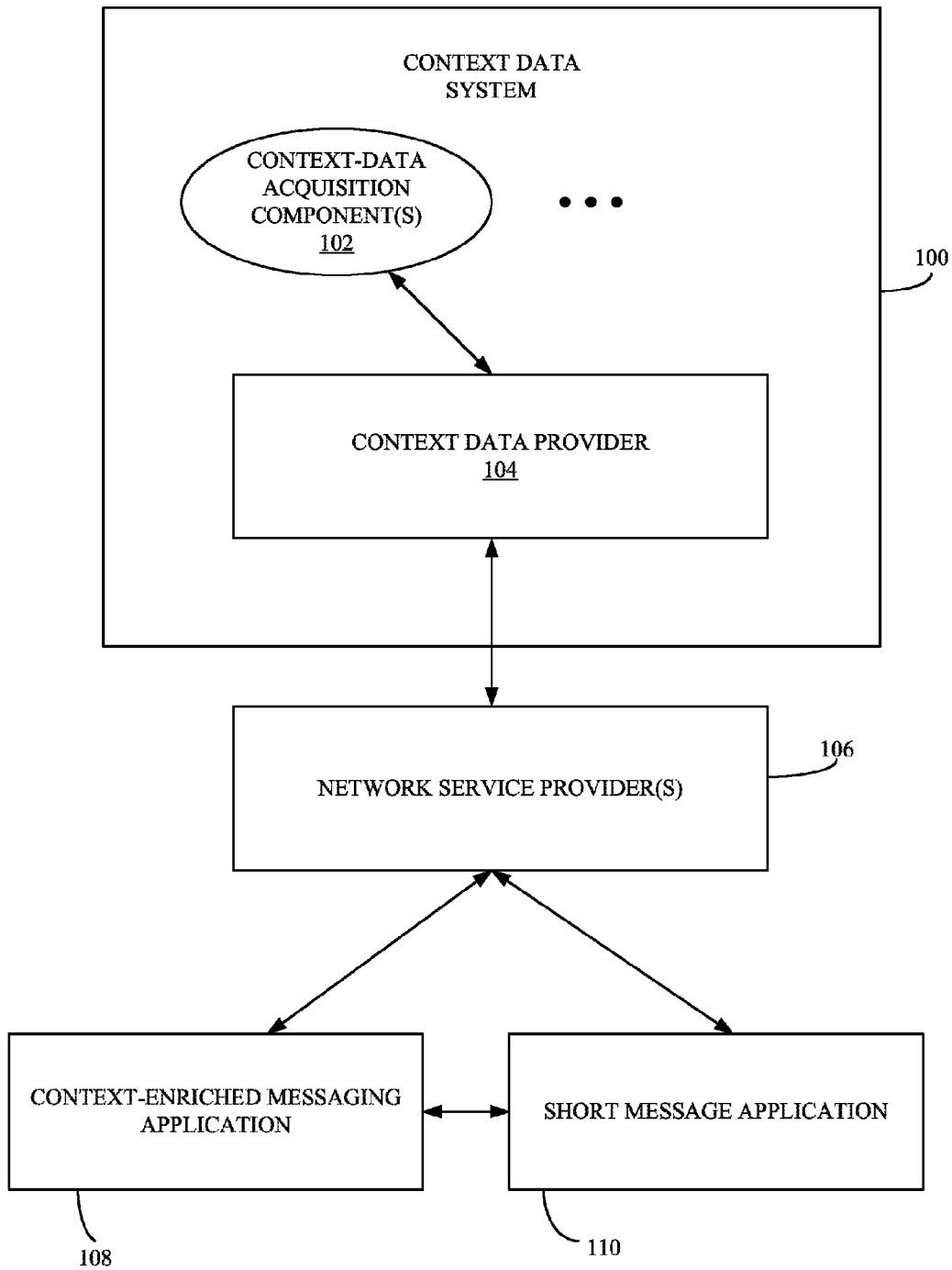
FIG. 1 is a diagram illustrating an environment in which one or more embodiments can be implemented.

FIG. 1 is a diagram illustrating an environment in which one or more embodiments can be implemented. The environment includes a context-data system 100, network service provider(s) 106, a context-enriched messaging application 108 and/or receiving short-message application 110. Context-data system 100 can further include context-data acquisition component 102 and/or context data provider 1044. It will be appreciated that, in some embodiments, all the elements of FIG. 1 need not be arranged as shown, not all elements are required and that other elements can be added to, or replace, those shown. For example, some elements shown as a singular element in FIG. 1 may be extant as a plurality in other embodiments. In some embodiments, the operations of context-data system 100 can be performed by and/or be distributed between one or more entities. Furthermore, in some embodiments, a receiving mobile device may include another context-enriched messaging application 108 instead of or in addition to receiving short-message application 110.

Context-data system 100 can include a context-data provider 104. Context-data provider 104 can be arranged to provide context data to a mobile-device application such as context-enriched messaging application 108 and/or short-message application. In some embodiments, context-data provider 104 can be arranged to receive a query from a mobile device (e.g. a smart phone, portable digital assistant, tablet computer, cellular telephone and the like). The query can include a request for a context data related to the context of the mobile device and/or relevant to a component of a short message generated by the context-enriched messaging application 108.

In some embodiments, the query can include a component of a short message generated with the mobile device. Context-data provider 104 can then be arranged to analyze the short message component to determine the relevant type context data. Relevancy between a context data and short-message component can be determined in a variety of manners. For example, a table can be used to match a particular word and/or phrase of a short message with a predetermined context-data type. In another example one or more pattern recognition algorithms can be used to determine the meaning of a word and/or phrase. The context-data type can then be selected according to the meaning of the word and/or phrase. Suitable types of pattern recognition algorithms can include neural networks, support vector machines, decision trees, K-nearest neighbor, Bayesian networks, Monte Carlo methods, bootstrapping methods, boosting methods, or any combination thereof.

Context-data provider 104 can be arranged to acquire context data from context-data acquisition component 102. Furthermore, in some embodiments, context-data provider 104 can be arranged to analyze the context data to determine a context-enhancement data (e.g. data that further describes the context data, media that enriches a user's experience of the context data, and so forth). In some embodiments, context-data provider 104 can provide the context data and /or the context enhancement data to context-enriched messaging application 108 and/or short-message application 110.

Context-data acquisition component 102 can include devices, functionalities and systems arranged to acquire context data. For example, context-data acquisition component 102 can include native and remote sensors. Example sensors include, inter alia, global positioning system systems, accelerometers, inclinometers, position sensors (compass, magnetometer), barometers, WiFi sensors, RFID sensors, near-filed communication (NFC) devices, gyroscopes, pressure sensors, pressure gauges, time pressure gauges, torque sensors, ohmmeters, thermometers, infrared sensors, microphones, image sensors (e.g. digital cameras), biosensors (e.g. photometric biosensors, electrochemical biosensors), capacitance sensors, radio antennas, biometric sensors, capacitance probes, medical-device sensors and for any combination thereof. In at least one example embodiment, context-data acquisition component 102 can include a smart device or a network of related smart devices. It should also be noted that the other sensor devices other than those listed can also be utilized to 'sense' context data. A remote sensor can also include a processor, power source and/or networking interface.

It should be noted that in some embodiments, a remote sensor can be integrated into another mobile device. For example, context-data provider 104 can be arranged to implement a functionality that determines the location of other mobile devices registered with the system from geo-location data provided by the mobiles devices, other sensors in the system, and/or other geolocation operations. A database of available sensors in each mobile device can also be maintained. Thus, the other mobile devices can be used to acquire context data. In certain embodiments, the database can include other mobile device attributes and/or user attributes such as power supply availability, cellular service provider information, user-demographic information, user state, user-behavior patterns (such as social networking behavior) and the like. Context-data provider 104 can then use the database to query the mobile device for sensor data (such as context data) and/or other information relevant to generating a context data for the querying context-enriched messaging application 108 and/or other mobile device application or utility. In some embodiments, mobile devices in the system can be arranged to periodically upload certain sensor data and/or other pertinent metadata to the database. Thus, in some embodiments, the database can be queried to acquire context data.

In some embodiments, context data can be derived from virtual sensors that measure an attribute of a virtual environment (e.g. a video game environment, a virtual world such as Second Life™) in addition to physical sensors that measure attributes of the physical environment of the mobile device and/or attributes of physical entities (e.g. a user state, a computer state).

In some embodiments, context-data acquisition component 102 can include a wireless sensor network (WSN) and/or a virtual sensor network (VSN). For example, a WSN can be implemented as a network of distributed autonomous sensors that cooperatively monitor physical or environmental conditions, such as temperature, sound, vibration, pressure, motion or pollutants. In another example, a VSN can involve dynamically varying subset of remote sensors. In such a case, remote sensors can detect how a phenomenon changes with time as the phenomenon migrates.

In other embodiments, context-data system 100 can be included in a context-data aggregator (not shown) that includes servers arranged to aggregate context-data and/or other relevant data from one or more context-data acquisition components. A context-data aggregator can provide an intermediary context-data database available for context-data provider 104.

In some embodiments, context-data system 100 can be arranged to interface with network service providers 106. Network service providers 106 network one or more computers, sensors and/or mobile devices (e.g. the Internet, a wide area network, a telecommunicate ions network, a cellular network, and the like). Example, network service providers 106 can include internet service providers (ISPs), cellular network providers (e.g. AT&T®, Verizon®, and so forth) and/or local area network providers (that communicatively couples context-data acquisition component 102 with context data provider 104).

Context-enriched messaging application 108 can reside in a computer such as a mobile device. Context-enriched messaging application 108 can be arranged to context enrich short messages (e.g. SMS, EMS, MMS, proprietary application-generated messages and the like) with context data. Short messages can be received from a short-message application 110. Short messages can be context enriched by associating components of the short message (e.g. a word, phrase, media image) with one or more context data. It will be appreciated that various methods can be utilized to associate the context data with the short message. Example methods include, inter alia, hyperlinks, appending context data to the short message, encoding the context data into the short message with a markup language, providing a network address to a server where the context data can be acquired, explicit textual references, graphical elements and the like. In some embodiments, receiving short message application also can be arranged to format a context-enriched short message for presentation with a graphical user interface (GUI) of a receiving mobile device. It should also be noted, that a context-enriched messaging application 108 can reside on both a sending and a receiving mobile device.

Typically, short message application 110 can include, for example, an instant-messaging (IM) application, an e-mail application, an SMS application, an EMS application and an MMS application (e.g. context-enriched messaging application 406 described infra), and the like. In other embodiments, context-data provider 104 and/or context-enriched messaging application 108 can also be arranged to format the context-enriched short message for presentation with a GUI if short message application 110 does not include such a context-enriched short message formatting functionality. In some embodiments, a receiving device can include context-enriched messaging application 108 as well. However, it should be noted that it is not necessary for a receiving device to include context-enriched messaging application 108 in order to receive and display the short message and/or context data. A short-message application 110 can reside on both a sending and a receiving mobile device.

Figure 2:
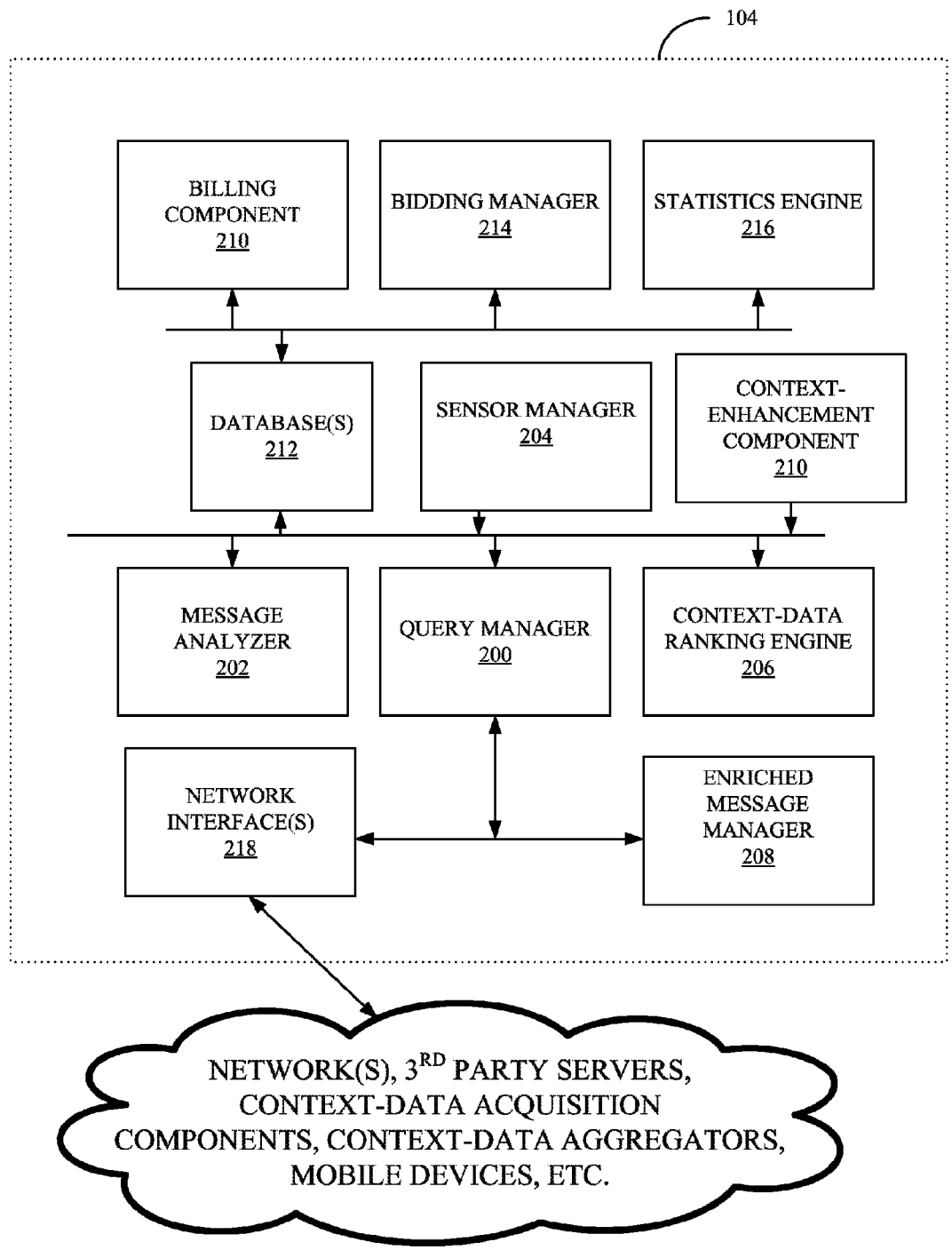
FIG. 2 is a diagram functionally illustrating an example context-data provider, according to one or more embodiments.

FIG. 2 is a diagram functionally illustrating an example context-data provider 104, according to one or more embodiments. Query manager 200 can be arranged to manage an incoming query message for context data. Query manager 200 can be arranged to parse an incoming query message and/or short message. In some embodiments, query manager 200 can be arranged to format incoming queries and/or short messages for analysis by the other modules of FIG. 2.

If the query includes a short message, message analyzer 202 can be arranged to analyze the short message to determine components of the short message to associate with certain context-data types. For example, certain words, phrases and/or media types of the short message can associated (e.g. indexed) with a certain context-data type.

In another example, a user of a device that generated the short message can have indicated a specified context-data type to associate with a specified short message component. In yet another example, the query can include a request to acquire one or more context-data types and not include a short message or short message component.

Sensor manager 204 can be arranged to acquire context data from available context-data sources according to the specified context-data types from the query manager and/or the message analyzer 202. For example, sensor manager 204 can communicate a request to a context-data acquisition component 102 to obtain and return a context-data. In one example, sensor manager 204 can first query database 212 for a context-data that has been obtained within a certain period. Sensor manager 204 can also store context data in database 206 with a time stamp. Additionally, sensor manager 204 can be arranged to acquire context-data from third party servers (e.g. a context-data aggregator).

Context-data ranking engine 206 can be arranged to rank context data. For example, context-data ranking engine 206 can determine a ranking value associated with each acquired context data according to a specified parameter. The context data can then be ranked according to the ranking values. Example parameters include recency of context-data acquisition, cost of context data as determined by a context-data acquisition component 102, accuracy of context data, proximity of context data source to a relevant device (e.g. a sending mobile device), bidding offers by context-data acquisition component(s)s 102 and/or any combination thereof.

Enriched-message manager 208 can be arranged to format and communicate context data and/or context-enriched short messages to a mobile device. Example mobile devices can include a mobile device that generated the query and/or a mobile device that is the addressed recipient of the original short message. In some embodiments, enriched-message manager 208 can generate a different type of message for each receiving mobile device. Enriched-message manager 208 can select context data according to the ranked list provided by context-data ranking engine 206. It should be noted that in some embodiments, enriched-message manager 208 can be modified and included in a mobile device (e.g. a mobile device that sends and/or receives context-enriched short messages).

In some embodiments, context-enhancement component 210 can be arranged to analyze a context data selected for a query response and/or a context-enriched message. Context-enhancement component 210 can determine, acquire and associate context-enhancement data with the context data. Context-enhancement component 210 can include a database and/or Internet search engine. Context-enhancement can be data acquired from third party services that further explain and/or elaborate on the context data. For example, if the context data is a geolocation data then context-enhancement data can include a web page document from a web mapping service application (such a Google Maps®).

Billing component 210 can be arranged to perform billing-related functions. Users of context-data provider 104 and/or context-data acquisition component 102 services can be billed for the acquisition of context data. Billing component 210 can generate and digitally communicate invoices. The data required for, or obtained by, billing component 210 can be stored in database 212. In some embodiments, billing component 210 can manage an online money transfer service that allows end user to purchase context data from context-data acquisition component(s) 102.

Database 212 can be arranged to include a variety of data used by context-data system 100 and more particularly, by context-data provider 104. Database 212 can include information such as a list of context-data acquisition components 112, a network address of context-data acquisition components 112, current context data, historical context data, specified parameters associated with certain types of context data, specified parameters associated with certain registered mobile devices, specified parameters associated with certain context-enriched messaging applications 108, specified parameters associate with certain short message applications 110, historical context-data bidding information, context-data acquisition component registers (including location and state information), bidding information, user information, information used to locate a mobile device and/or an application residing in a mobile device (e.g. an IP address, short codes, SMS address information), query data, short message data and the like. Multiple databases can be employed for gathering and storing information used in context-data system 100.

In some embodiments, bidding manager 214 can be arranged to manage context-data transactions between a context-data acquisition component 102 and a context-enriched messaging application 106. In some embodiments, one or more context-data acquisition components 102 can provide context data to context-data provider 104. Context-enriched message application 108 can purchase the context data from the bidding manager 214.

In some embodiments, bidding manager 214 can be arranged to allow a context-data acquisition source(s) 102 to set and/or reset a cost of acquiring a particular context-data. Bidding manager 214 can also provide information about the cost of the particular context data to an end user of a context-enriched messaging application 108 that provided the query. In some embodiments, the end user can then select a context data and be charge the cost of the context data. In some embodiments, bidding manager 214 can facilitate a counter offer for the particular context data from the end user. In some embodiments, bidding manager 214 can facilitate various other online bidding business models such as an online auction business model. In some embodiments, advertisements can be included in a context-enriched short message in order to offset the cost of the context data. For example, such advertisements can be provided by third parties and displayed in a context-enriched short message on a receiving device. An advertising third party can then pay all or a portion of the cost of the context data. In some embodiments, enriched message manager 208 can include a functionality for integrating advertisements into either a content data returned to a query originator and/or a context-enriched text message forwarded to a receiving device.

In some embodiments, bidding information can be communicated through short messages between the various parties involved. Alternatively or additionally, bidding manager 214 can manage a website that provides context-data cost information as well as facilitates bidding.

Statistics engine 216 can be arranged to include information pertaining to the selection of context data and/or performance of context-data acquisition components 102. Statistics engine 216 can log statistics in database 212. Sensor manager 204 can use information acquired by statistics engine to streamline context-data acquisition operations. For example, sensor manager 204 can focus requests for context-data on more reliable context-data acquisition components 102 and/or context-data acquisition components 102 that provide data at a lower cost. In some embodiments, data generated by statistics engine 216 can be included in a short message as context-enhancement data.

Network interfaces 218 is a component that interfaces with various communications networks such as cellular networks, IP networks (e.g. the Internet), local area networks (LAN), private wide area networks (WAN), a network using an open wireless technology standard for exchanging data over short distances (using short length radio waves) from fixed and mobile devices and/or any combination thereof.

In one example, a mobile device can generate a short message that reads "I am here". The short message may be communicated by the sending mobile device and/or a short message service provider to the context-data provider 104. Message analyzer 202 can determine that short message component "here" is to be associated with the context-data type of geolocation data of a mobile device that generated the short message. Accordingly, sensor manager 204 can obtain context data from sources relevant to the geolocation of the sending mobile device. For example, sensor manager 204 can acquire geolocation context data from various context-data acquisition components 102. Context-data acquisition components 102 can utilize methods such as associating the geographic location with the Internet Protocol (IP) address of the mobile device and/or nearby fixed server, the MAC address mobile device, nearby RFID device, hardware embedded article/production number, embedded software number (such as UUID, Exif/IPTC/XMP or modern steganography (for example, in a nearby smart device)), a Wi-Fi connection location in proximity to the mobile device, device GPS coordinates of the mobile device, assisted GPS, enhanced GPS and/or self-disclosed information. Context-data ranking engine can rank the acquired geolocation data according to cost and method accuracy. A top ranked geolocation data can be provided by the query manager 200 to the requesting mobile device that generated the query. Bidding manager can charge the requesting mobile device an amount specified by the context-data acquisition component 102 that provided the selected geolocation data. The embodiments are not limited in this context.

Figure 3:
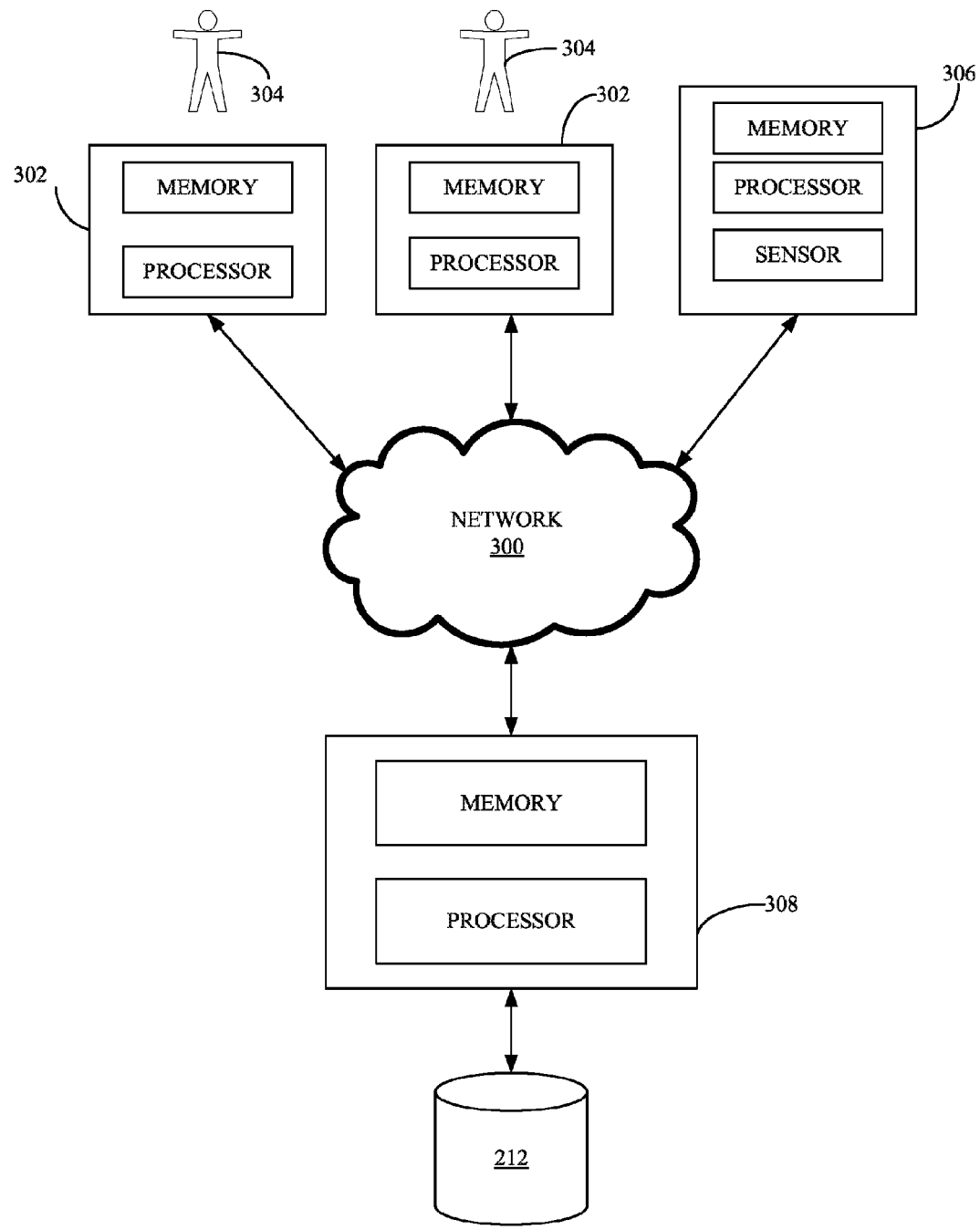
FIG. 3 is a diagram illustrating an architecture in which one or more embodiments can be implemented.

FIG. 3 is a diagram illustrating an architecture in which one or more embodiments can be implemented. The architecture includes multiple client devices 302, remote sensor(s) 306, a server device 308, and a network 300, which can be, for example, the Internet. Client devices 302 each include a computer-readable medium, such as random access memory, coupled to a processor. Processor executes program instructions stored in memory. Client devices 302 can also include a number of additional external or internal devices, such as, without limitation, a mouse, a CD-ROM, a keyboard, and a display. Thus, as will be appreciated by those skilled in the art, the client devices may be mobile personal computers, gaming computer system, personal digital assistances, mobile phones, content players, tablet computers (e.g. the iPad® by Apple Inc.), etc.

Through client devices 302, users 304 can communicate over network 300 with each other and with other systems and devices coupled to network 300, such as server device 308, remote sensors, smart devices, third-party servers, and the like.

Remote sensor 306 can also be a client device that includes a sensor. Remote sensor can communicate with other systems and devices coupled to network 300.

Similar to client devices 302, server device 308 can include at least one processor coupled to a computer readable memory. Server device 308 may additionally include a secondary storage element, such as a database 212 and/or other database systems.

Client processors and server processor can be any of a number of well-known microprocessors. Memory may contain a number of programs, such as the components described above in reference to FIGS. 1 and 2. In some example embodiments, client device 302, remote sensor 304 and/or server device 308 can be virtualized and reside in other computer systems.

In general, client device 302 may be any type of computing platform connected to a network and that interacts with application programs, such as a digital assistant or a "smart" cellular telephone. Remote sensor 306 and server 308, although depicted as a single computer system, may be implemented as a network of computers and/or computer processors.

Figure 4:
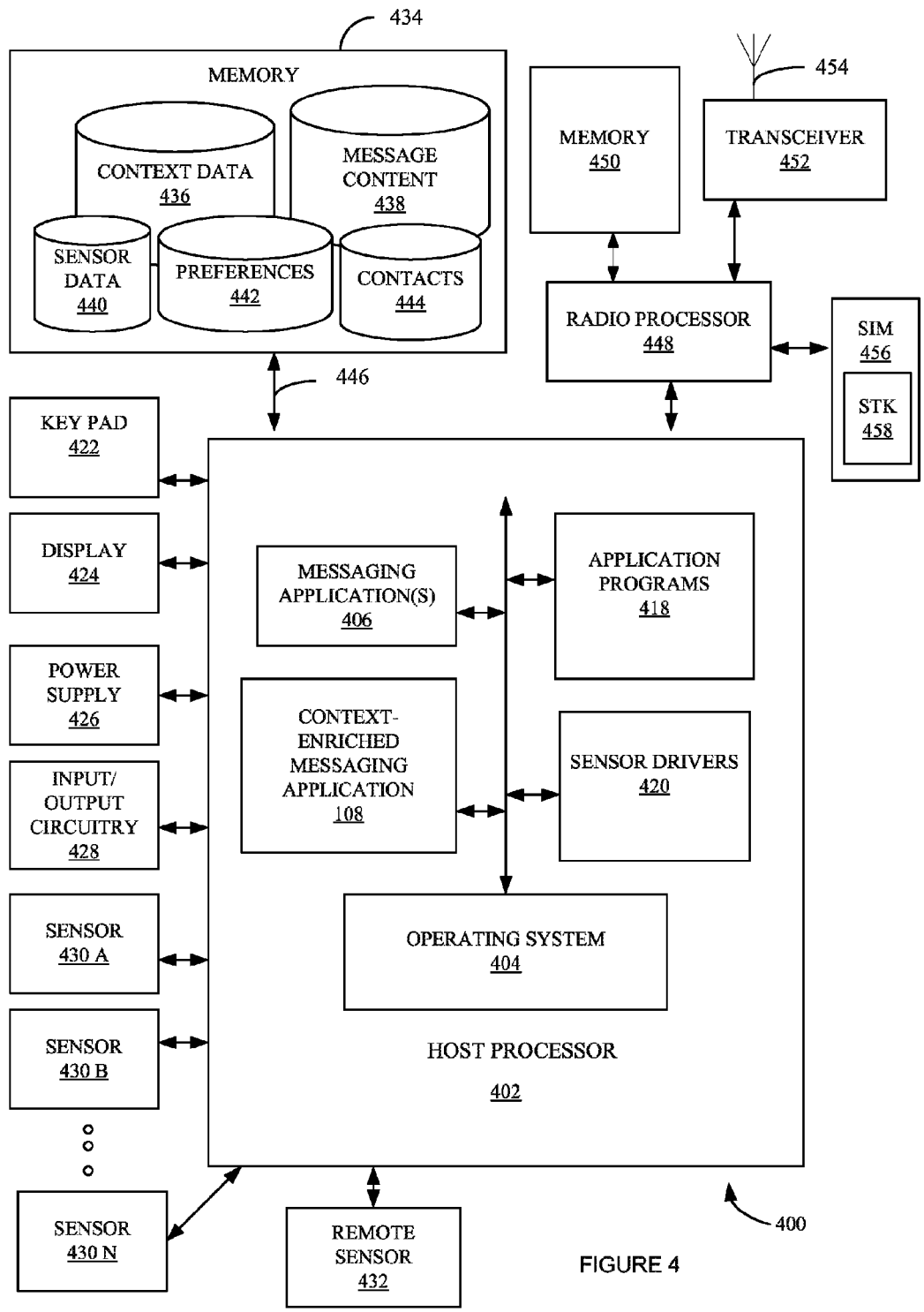
FIG. 4 illustrates an exemplary mobile device in accordance with one or more embodiments.

FIG. 4 illustrates a mobile device 400 in accordance with one or more embodiments. In some embodiments, mobile device 400 may be implemented as a combination handheld computer and mobile telephone, sometimes referred to as a smart phone. Mobile device 400 may provide voice and/or data communications functionality in accordance with different types of cellular radiotelephone systems. Examples of cellular radiotelephone systems may include CDMA systems, GSM systems, North American Digital Cellular (NADC) systems, TDMA systems, Extended-TDMA (E-TDMA) systems, Narrowband Advanced Mobile Phone Service (NAMPS) systems, 3G systems such as Wide-band CDMA (WCDMA), CDMA-2000, Universal Mobile Telephone System (UMTS) systems, and so forth.

In addition to voice communications functionality, mobile device 400 may be arranged to provide mobile packet data communications functionality in accordance with different types of cellular radiotelephone systems. Examples of cellular radiotelephone systems offering mobile packet data communications services may include, inter alia, GSM with GPRS systems (GSM/GPRS), CDMA/1xRTT systems, Enhanced Data Rates for Global Evolution (EDGE) systems, EV-DO systems, Evolution For Data and Voice (EV-DV) systems, High Speed Downlink Packet Access (HSDPA) systems, High Speed Uplink Packet Access (HSUP A), and so forth.

Mobile device 400 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

Mobile device 400 may be arranged to perform data communications in accordance with different types of shorter-range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radiofrequency identification (RFID) protocols and devices.

As shown in the embodiment of FIG. 4, mobile device 400 can include a dual processor architecture including a host processor 402 and a radio processor 448. In some embodiments, host processor 402 and the radio processor 448 can be arranged to communicate with each other using interfaces such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth. Host processor 402 can be responsible for executing various software programs such as system programs and applications programs to provide computing and processing operations for the mobile device 400. Radio processor 448 can be responsible for performing various voice and data communications operations for mobile device 400 such as transmitting and receiving voice and data information over one or more wireless communications channels. Although some embodiments can be described as comprising a dual processor architecture for purposes of illustration, it is worthy to note that mobile device 400 can include any suitable processor architecture and/or any suitable number of processors in accordance with the described embodiments.

Host processor 402 can be implemented as a host central processing unit (CPU) using any suitable processor or logic device, such as a as a general purpose processor. Although some embodiments can be described with host processor 402 implemented as a CPU or general purpose processor by way of example, it can be appreciated that the embodiments are not limited in this context. For example, host processor 402 can include, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments. Host processor 402 can be arranged to provide processing or computing resources to the mobile device 400. For example, host processor 402 can be responsible for executing various software programs including system programs such as operating system (OS) 404, context-enriched messaging application 108, messaging applications 406 (e.g. short message application 110), application programs 418 and sensor drivers 420. System programs generally can assist in the .running of the mobile device 400 and can be directly responsible for controlling, integrating, and managing the individual hardware components of the computer system. In some embodiments, OS 404 can be implemented, for example, as an Apple iOS, Blackberry OS, Android OS, Symbian OS, Palm Web OS, Microsoft Windows Mobile, LiMo, MeeGo, Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Runtime Environment for Wireless (BREW) OS, Java OS, a Wireless Application Protocol (WAP) OS, or other suitable OS in accordance with the described embodiments. The mobile device 400 can include other system programs such as device drivers, programming tools, utility programs, software libraries, application-programming interfaces (APIs), and so forth.

Host processor 402 can include messaging application 406. Messaging application 406 can include a variety of text messaging applications that communicate various types of short messages in a variety of formats. Each messaging application can be representative of a particular kind of transport, enabling handling of short messages of particular types and formats for the particular application. The messaging applications can include, for example, an IM application, an e-mail application, an SMS application, and an MMS application. It is to be understood that the embodiments are not limited in this regard and that the messaging applications can include any other type of messaging or communications application in accordance with the described embodiments. In some embodiments, messaging applications can include a utility for converting voice messages to text. In this way, a voice message can be rendered into a short message format by a utility of messaging application 406. Voice message data can be acquired from such applications as a telephone application such as a cellular telephone application, a Voice over Internet Protocol (VoIP) application, a Push-to-Talk (PTT) application, voicemail, and so forth.

Host processor 402 can include a context-enriched messaging application 108. Context-enriched messaging application 108 can be arranged to enrich short messages (e.g. SMS, EMS, MMS, other proprietary application-generated messages and the like) generated with the mobile device 400. In some embodiments, the short messages can be context enriched to include and/or refer to context data that provides information about the physical environment of mobile device 400. Example reference devices include, inter alia, a hyperlink to a web document that includes the context data and/or an embedded URL to trigger the receiver's WAP browser to open and receive the context data from the embedded URL. Context-enriched messaging application 108 can communicate context-enriched messages, context data and/or short messages to a next appropriate entity according the various embodiments. For example, if the context-enriched message is an SMS message, context-enriched messaging application 108 can forward the context-enriched SMS message to an SMSC or VAS server, or similar entity of a cellular network. In another example, context-enriched messaging application 108 can forward the context-enriched message to a server if the context-enriched message utilizes an IP-based means of delivery (such as the Internet). Context-enriched messaging application 108 can be arranged to determine an appropriate context data to associate with the short message such as according to any of the various metrics discussed herein. Context-enriched messaging application 108 can also be arranged to manage sensors 430 A-N and 432 according to the various system attributes of the mobile device such as power availability, sensor power use, mobile device context, sensor availability and the like. Context-enriched messaging application 108 can also acquire context data from context provider 104. In one example embodiment, context-enriched messaging application 108 can provide context data to enrich a communication of messaging application 406.

Application programs 418 generally can allow a user to accomplish one or more specific tasks. In various implementations, the application programs 418 can provide one or more graphical user interfaces (GUIs) to communicate information between the mobile device 400 and a user. In some embodiments, application programs 418 can include upper layer programs running on top of the OS 404 of host processor 402 that operate in conjunction with the functions and protocols of lower layers including, for example, a transport layer such as a Transmission Control Protocol (TCP) layer, a network layer such as an IP layer, and a link layer such as a Point-to-Point (PPP) layer used to translate and format data for communication. Examples of application programs 418 can include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaining applications, image recognition applications (e.g. Google Goggles™ from Google Inc.) and so forth. It is also to be appreciated that the mobile device 400 can implement other types of applications in accordance with the described embodiments.

Sensor drivers 420 can be arranged to allow other programs such as OS 404, application programs 418, Context-enriched messaging application 108 and the like, to interact with sensors coupled with host processor 402. Sensor drivers 420 can be specific to a sensor-type. Sensor drivers 420 can typically communicate with a sensor through a computer bus and/or communications subsystem to which the sensor connects. In some embodiments, sensor drivers 420 can communicate with one or more remote sensors 432 via a wireless interface, LAN and/or the Internet. In some embodiments, context-data provider 104 can utilize sensor drivers 420 to acquire context data from sensors 430 A-B and/or 432. In such a case, mobile device 400 can include a utility to implement the communication between context-data provider 104 and sensors driver 420.

Mobile device 400 can include an alphanumeric keypad 422 coupled to the host processor 402. Keypad 422 can include, for example, a QWERTY key layout and an integrated number dial pad. Mobile device 400 can include various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. In some embodiments, keypad 422 can be virtualized and rendered on touchscreen by a graphical user interface (GUI) utility.

Mobile device 400 can include a display 424 coupled to the host processor 402. The display 424 can include any suitable visual interface for displaying content to a user of the mobile device 400. In one embodiment, for example, the display 424 can be implemented by a liquid crystal display (LCD) such as a touch-sensitive color (e.g., 16-bit color) thin-film transistor (TFT) LCD screen. In some embodiments, the touch-sensitive LCD can be used with a stylus and/or a handwriting recognizer program.

Host processor 402 can be coupled to a power supply 426 arranged to supply and manage power to the elements of mobile device 400. In some embodiments, the power supply 426 can be implemented by a rechargeable battery, such as a removable and rechargeable lithium ion battery to provide direct current (DC) power, and/or an alternating current (AC) adapter to draw power from a standard AC main power supply.

Host processor 402 can be coupled to sensors 430 A-N and/or remote sensor 432. A sensor can be arranged to translate a physical characteristic of the environment of the mobile device 400 into a computer-processor readable format. Example sensors include, inter alia, global positioning system systems, accelerometers, inclinometers, position sensors (compass, magnetometer), barometers, WiFi sensors, RFID sensors, near-filed communication (NFC) devices, gyroscopes, pressure sensors, pressure gauges, time pressure gauges, torque sensors, ohmmeters, thermometers, infrared sensors, microphones, image sensors (e.g. digital cameras), biosensors (e.g. photometric biosensors, electrochemical biosensors), capacitance sensors, radio antennas, biometric sensors, capacitance probes and/or any combination thereof. It should be noted that the other sensor devices other than those listed can also be utilized to 'sense' context data.

Mobile device 400 can include an input/output (I/O) circuitry 428 coupled to the host processor 402. I/O circuitry 428 can include one or more I/O devices such as a serial connection port, an infrared port, integrated Bluetooth™ wireless capability, and/or an integrated 802.11x (WiFi) wireless capability, to enable wired (e.g., USB cable) and/or wireless connection to a local computer system, such as a local personal computer (PC). In various implementations, mobile device 400 can be arranged to transfer and/or synchronize information with the local computer system. Various audio/video (AV) devices that support AV capability of the mobile device 400 can also be included. Examples of AV devices can include, for example, a microphone, one or more speakers, an audio port to connect an audio headset, an audio coder/decoder (codec), an audio player, a MIDI device, a digital camera, a video camera, a video codec, a video player, and so forth.

As shown, host processor 402 can be coupled through memory bus 446 to a memory 434. Memory bus 446 can include any suitable interface and/or bus architecture for allowing host processor 402 to access memory 434. Although memory 434 can be shown as being separate from host processor 402 for purposes of illustration, it is worthy to note that in various embodiments some portion or the entire memory 434 can be included on the same integrated circuit as host processor 402. Alternatively, some portion or the entire memory 434 can be disposed on an integrated circuit or other medium (e.g., hard disk drive) external to the integrated circuit of host processor 402. In various embodiments, mobile device 400 can include an expansion slot to support a multimedia and/or memory card, for example.

Memory 434 can be implemented using any computer-readable media capable of storing data such as volatile or non-volatile memory, removable or nonremovable memory, erasable or non-erasable memory, writeable or re-writeable memory, and so forth. Examples of computer-readable storage media can include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

As mentioned above, radio processor 448 can perform voice and/or data communication operations for mobile device 400. For example, radio processor 448 can be arranged to communicate voice information and/or data information over one or more assigned frequency bands of a wireless communication channel. In various embodiments, radio processor 448 can be implemented as a communications processor using any suitable processor or logic device, such as a modem processor or baseband processor. Although some embodiments can be described with radio processor 448 implemented as a modem processor or baseband processor by way of example, it can be appreciated that the embodiments are not limited in this context. For example, radio processor 448 can include, or be implemented as, a digital signal processor (DSP), media access control (MAC) processor, or any other type of communications processor in accordance with the described embodiments.

In various embodiments, radio processor 448 can perform analog and/or digital baseband operations for mobile device 400. For example, radio processor 448 can perform digital-to-analog conversion (DAC), analog-to-digital conversion (ADC), modulation, demodulation, encoding, decoding, encryption, decryption, and so forth.

Mobile device 400 can include memory 434 coupled to radio processor 448. Memory 450 can be implemented using one or more types of computer-readable media capable of storing data such as volatile or non-volatile memory, removable or non-removable memory, erasable or non-erasable memory, writeable or re-writeable memory, and so forth. Memory 450 can include, for example, flash memory and secure digital (SD) RAM. Although memory 450 can be shown as being separate from and external to radio processor 448 for purposes of illustration, it is worthy to note that in various embodiments some portion or the entire memory 450 can be included on the same integrated circuit as radio processor 448.

Mobile device 400 can include a transceiver module 452 coupled to radio processor 448. Transceiver module 452 can include one or more transceivers arranged to communicate using different types of protocols, communication ranges, operating power requirements, FRO sub-bands, information types (e.g., voice or data), use scenarios, applications, and so forth. In various embodiments, transceiver module 452 can include one or more transceivers arranged to support voice communication for a cellular radiotelephone system such as a GSM, UMTS, and/or CDMA system. Transceiver module 452 also can include one or more transceivers arranged to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc), PAN protocols, Infrared protocols, Bluetooth protocols, EMI protocols including passive or active RFID protocols, and so forth. In some embodiments, transceiver module 452 can include a Global Positioning System (GPS) transceiver to support position determination and/or location-based services. Transceiver module 452 generally can be implemented using one or more chips as desired for a given implementation. Although transceiver module 452 can be shown as being separate from and external to radio processor 448 for purposes of illustration, it is worthy to note that in various embodiments some portion or the entire transceiver module 452 can be included on the same integrated circuit as radio processor 448. The embodiments are not limited in this context.

Mobile device 400 can include antenna system 154 for transmitting and/or receiving electrical signals. As shown, antenna system 154 can be coupled to radio processor 448 through transceiver module 452. Antenna system 154 can include or be implemented as one or more internal antennas and/or external antennas.

Mobile device 400 can include a subscriber identity module (SIM) 456 coupled to the radio processor 448. SIM 456 can include, for example, a removable or non-removable smart card arranged to encrypt voice and data transmissions and to store user-specific data for allowing a voice or data communications network to identify and authenticate the user. SIM 456 also can store data such as personal settings specific to the user. In some embodiments, SIM 456 can be implemented as an UMTS universal SIM (USIM) card or a CDMA removable user identity module (RUIM) card. SIM 456 can include a SIM application toolkit (STK) 458 including a set of programmed commands for enabling the SIM 456 to perform various functions. In some cases, STK 458 can be arranged to enable SIM 456 to independently control various aspects of mobile device 400.

B. Operation

Figure 5:
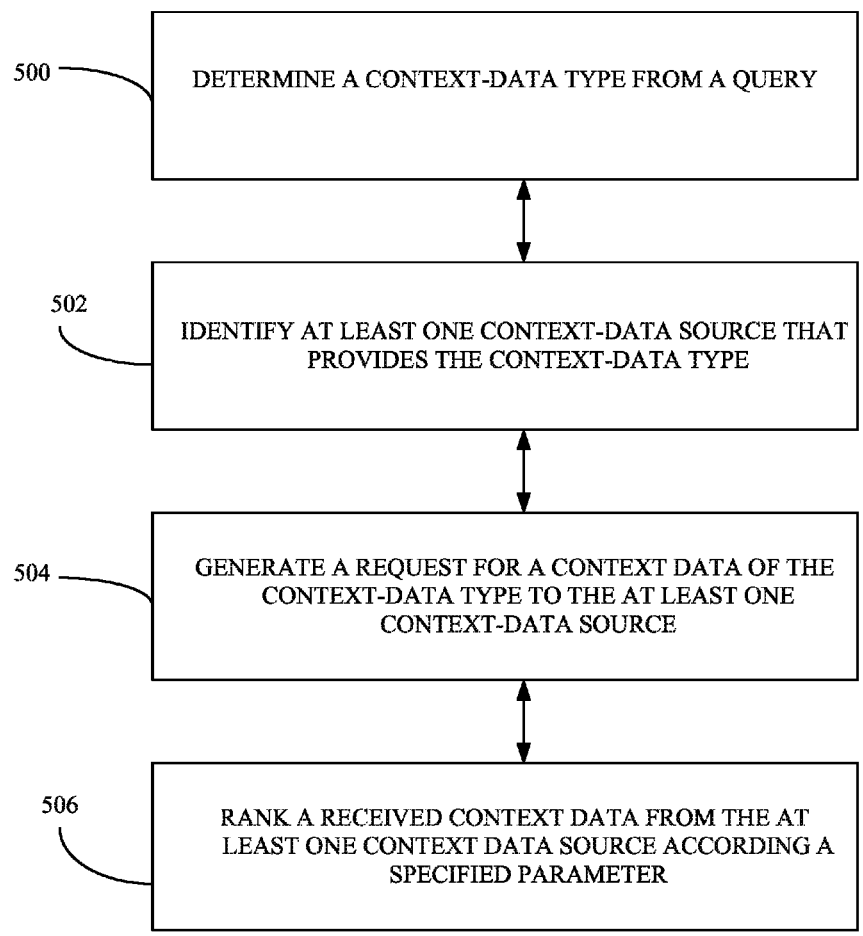
FIG. 5 is a flow diagram of an exemplary method for implementing one or more embodiments.

FIG. 5 is a flow diagram of an exemplary method for implementing one or more embodiments. The exemplary method is not limited by the order shown in the flow diagram. The process determines a context-data type from a query in step 500. In some embodiments, a query can include a request for a context-data. In some embodiments, the query can also include information to assist in determining a source for the context data. In some embodiments, the query can include a copy of a short message. The short message can be analyzed to determine relevant context data sources. Alternatively or in addition to, the query can request a context-data type for a specified location (e.g. the location of the device that generated the short message). The location can then be surveyed to determine at least one relevant context-data source (such as context-data acquisition component 102) from which to acquire a context data of the specified context-data type. For example, a query can be sent from a mobile device. The query may include a request for certain context data types related to the location of the mobile device. In one example, the query can also include a request to improve the accuracy of the location data of the mobile device using other geolocation operations available from other context-data sources.

In step 502, at least one context-data source that provides the context-data type is identified. For example, in some embodiments, context-data sources can integrated into an entity for the purpose of providing context data. In such a case, a list of the context-data sources can be available on a web page and/or from a server. In some embodiments, a context-data source can be located using a search algorithm. For example, a context-source can reside in a mobile device. An entity such as a cellular-network management server can be contacted to determine the location of the mobile device. In one example, the cellular-network management server can be contacted to determine if mobile devices with certain types of context-data sources are available in certain locations. Various types of context-data source identification operations can be used alone or in combination according to the various embodiments.

In step 504, a request for a context data of the context-data type to the at least one context data provider is generated. The request can be communicated to the context-data source(s). The requests can be formatted in accordance with the system and communication network protocols used by the context-data source(s).

In step 506, received context data from the at least one context-data source is ranked according a specified parameter. One example method of ranking is that each received context data can be weighted according the specified parameter. The parameter can be specified in the query and/or be specific to a particular context-data type. A table of parameters and associated context-data types can be stored in an available database. In some embodiments, multiple parameters can be used to rank the context data received from the context-data sources. Once the context data is ranked, one or more context data can then be selected. In some embodiments, election can depend on the context-data type and/or specified parameter used to rank the context data. For example, if the specified parameter is cost of the context data charged by the context-data source. Then the context-data ranked with the lowest cost can be selected.

Figure 6:
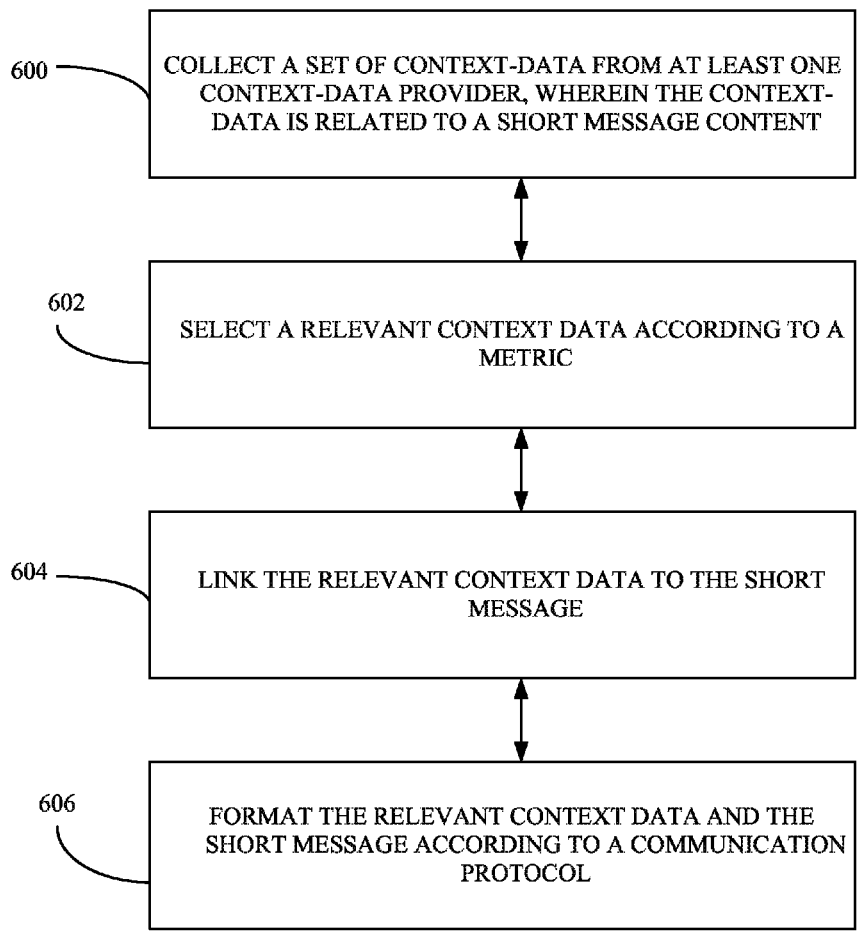
FIG. 6 is a flow diagram of an exemplary method for implementing one or more embodiments.

FIG. 6 is a flow diagram of an exemplary method for implementing one or more embodiments. The exemplary method is not limited by the order shown in the flow diagram. In step 600, a set of context-data from at least one context-data provider is collected. The context-data is related to a short-message content. In one example, the context data can be collected from a variety of) nodes representing sensors in a particular location that are available on one or more networks (e.g. LAN, WAN, the Internet). In a particular example, context-data from one or more sensors can be algorithmically combined and/or modified to generate a secondary context-data. For example, if the context-data type to be acquired is location data, then GPS context data from a variety of sources can be combined to determine an average GPS location. This average GPS location can then be collected into the set of context data. In yet another example, data from different sensor types can be combined and/or manipulated to generate another type of context data. For example, Wi-Fi location data (wireless local area network (WLAN) devices based on the IEEE 802.11 standards) can be averaged with GPS location data.

In step 602, a relevant context data is selected according to a metric. In some embodiments, the metric can be an assigned magnitude for a value of a context-data. In some embodiments, the metric can include a state of a receiving device. For example, a power-source of the receiving device can be obtained. The value of the power can then be an example of a metric used to selected the relevant context data. In some embodiments, the metric can be related to a content of the short message. For example, if the short message includes a term "here", the metric can be the accuracy of the location context data. In some embodiments, the metric can be related to an available bandwidth of a communication network. For example, if the short message is to be delivered via an SMS network, then the metric can include context-data that can be transported within the bandwidth limitations of the SMS network. In some embodiments, the metric can include a combination of other metrics.

In step 604, the relevant context data is linked to the short message. In one example, the context data can be appended to the short message. The context data can be modified according to the type of short message. In another example, a hyperlink to the context data can be included in the short message. In yet another example, the context data can be rendered as text and/or a graphical icon and included in the short message.

In step 606, the relevant context data and the short message are formatted according to a communication protocol. For example, in some embodiments, the context data can be formatted to be included in an SMS, EMS and/or MMS message according to the type of short message generated by the sending device. Alternatively, in other example embodiments, the original short message can be modulated into another short-message type in order to accommodate the context data.

Figure 7:
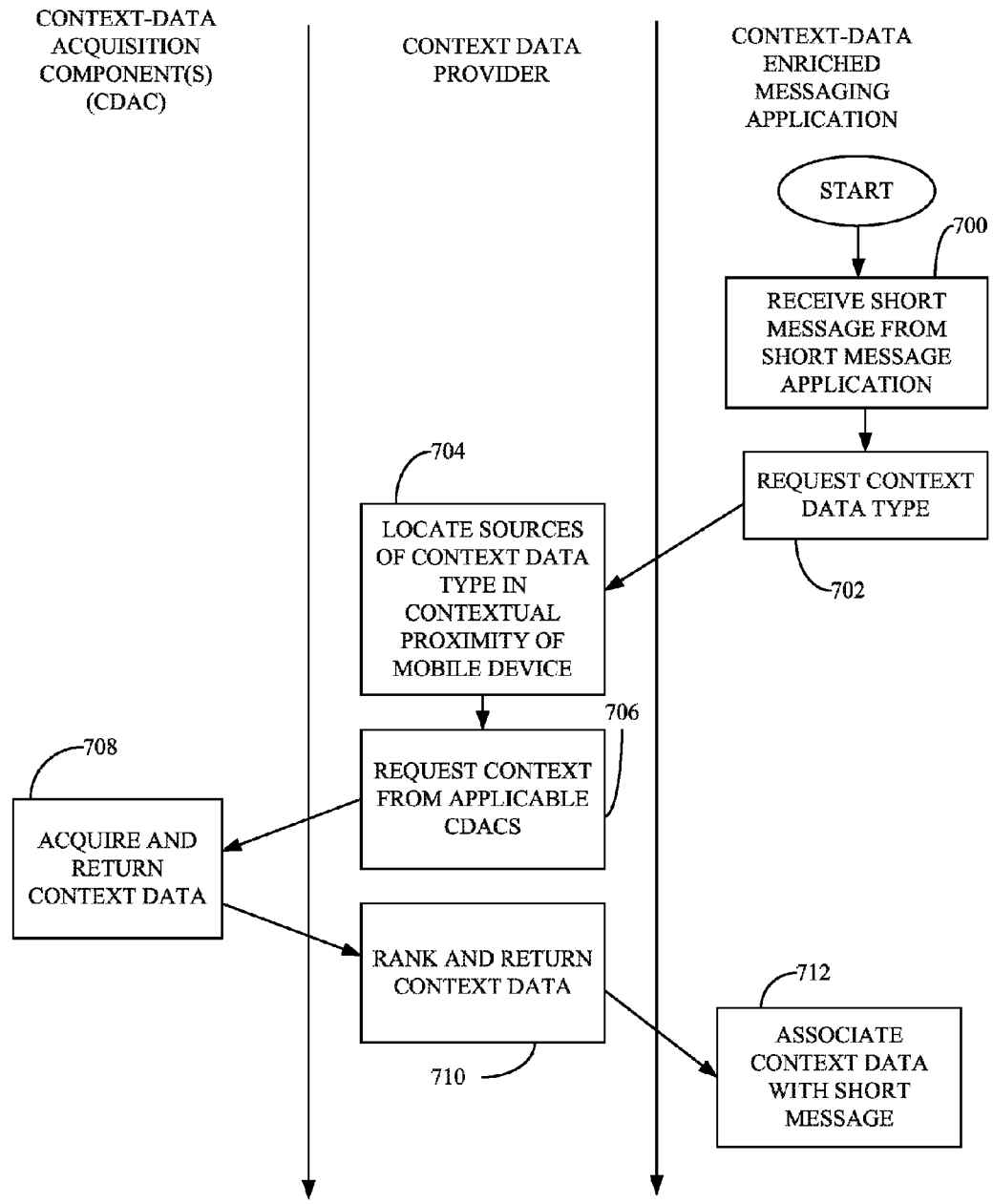
FIG. 7 shows a set of operations for context-data acquisition and ranking according one example embodiment.

FIG. 7 shows a set of operations for context-data acquisition and ranking according one example embodiment. In step 700, context-enriched messaging application 108 receives a short message from short message application 110. Both context-enriched messaging application 108 and short message application 110 can reside on a mobile device such mobile device 400. In step 702, context-enriched messaging application 104 can request a context-data type from a context-data provider 104 residing on a server. Context-data provider 104 can conduct a search of context-data type sources in the contextual proximity of the mobile device in step 704. In some embodiments, contextual proximity can include the conditions and circumstances of the mobile device that are relevant to a short message generated by the mobile device. In some embodiments, context-data acquisition components 102 can provide locations and available context-data types to context-data provider 104. Context-data provider 104 can then store the information in a register. Context-data provider 104 can periodically query context-data acquisition components 102 in order to update the register. Context-data provider 104 and context-data acquisition components 102 can communicate via any available communication network. In step 706, context-data provider 104 can request context-data from located context-data acquisition components 102 that provide the specified context-data type in the contextual proximity of the mobile device. In step 708, context-data acquisition components 102 can acquire context data (e.g. using a sensor) and return the context-data to context-data provider 104. In some embodiments, context-data acquisition components 102 can also return metadata regarding the state of the sensor used to acquire the context-data, as well as other pertinent information to context-data provider 104. This metadata can be used to rank and format returned context data. In step 710, context-data provider 104 ranks and returns one or more advantageously ranked context data to context-enriched messaging application 108. In step 712, context data is associated with the short message. Example methods of associating context data and the short message have been discussed supra. The resulting context-enriched short message can then be communicated by the mobile device to an appropriate communications network for forwarding to a receiving mobile device. The embodiments are not limited in this context.

Figure 8:
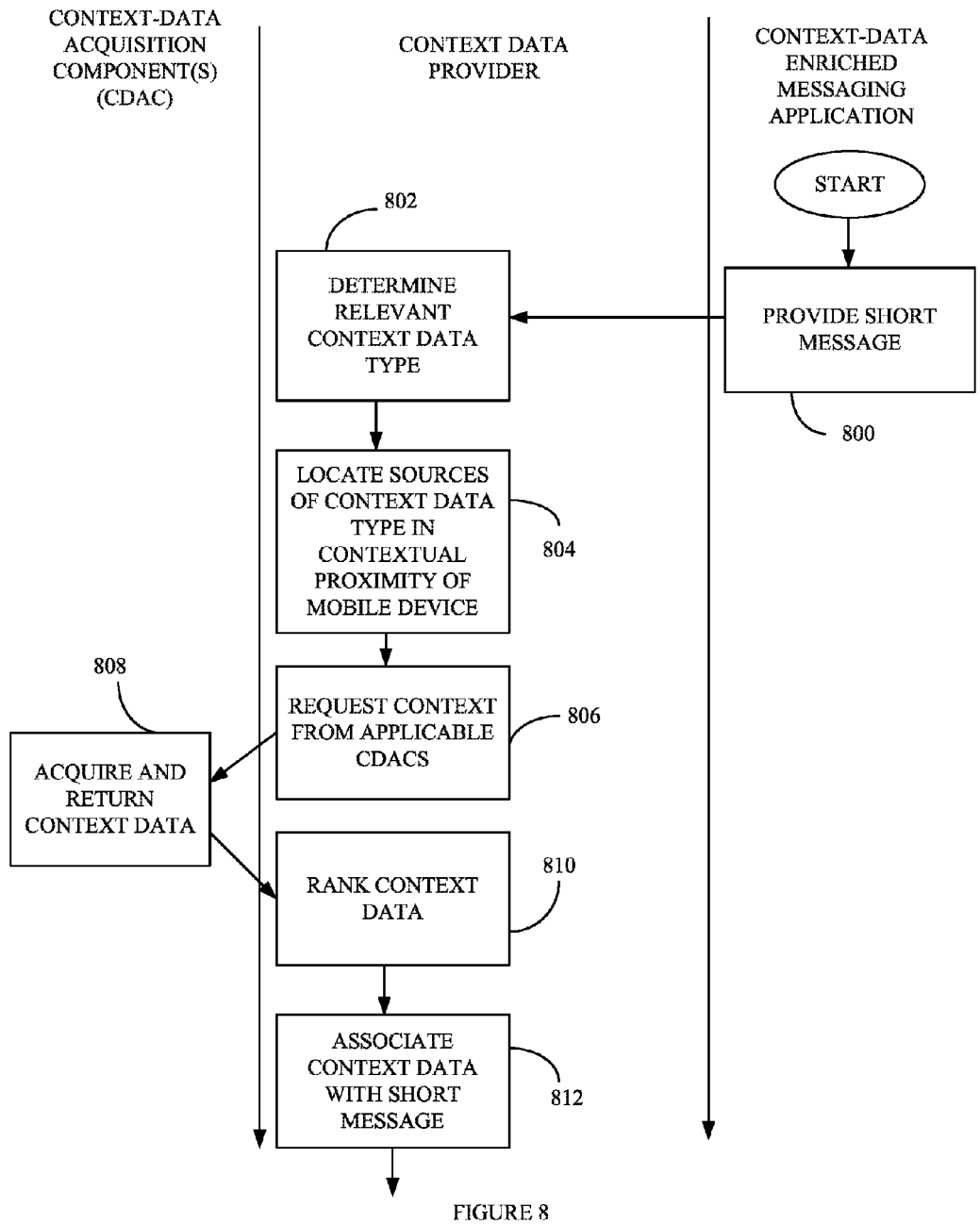
FIG. 8 shows a set of operations for context-data acquisition and ranking according another example embodiment.

FIG. 8 shows a set of operations for context-data acquisition and ranking according another example embodiment. In step 800, context-enriched messaging application 108 can provide a short message to context-data provider 104. Context-data provider 104 can analyze the short message to determine one or more context-data types to associate with the various words, phrases or media of the short message in step 802. Context-data provider 104 can locate one or more context-data type sources in the contextual proximity of the mobile device in step 804. A context data source can be a context-data acquisition component 102. Context-data acquisition component 102 can include, for example, smart devices with sensors, virtual sensors, databases with recently acquired context data, third-party servers, other mobile devices with sensors, and the like. Context-data acquisition components 102 can be placed into categories of context-data types acquirable by the respective context-data acquisition component 102. In step 806, context-data provider 104 can request context data from the located context-data sources. In step 808, the context data is acquired and returned by each context-data acquisition component 102 that received a request and was able to acquire a context-data measurement. In step 810, context-data provider 104 ranks the received context data according to a certain parameter. In step 812, context-data provider 104 associates the highest ranked context data with short message. The short message and associated context data can then be forwarded to a communication network by context-data provider 104 for delivery to a receiving mobile device short message application. The embodiments are not limited in this context.

C. Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense.

What is claimed is:

1. A method comprising:
receiving a short message from a mobile device with a server;
algorithmically determining a context-data type, wherein the context-data type is determined by a meaning of a term of the short message, and wherein the context-data type provides information about an environment of the mobile device;
identifying at least one context-data source that provides the context-data type;
algorithmically ranking the at least one context data source according a specified parameter, wherein the specified parameter comprises a pecuniary cost to acquire the context data from the at least one context data source; and
generating a request for a context data of the context-data type from the at least one context data source.

2. The method of claim further comprising:
providing the received context data to the device that generated a short message.

3. The method of claim further comprising:
providing the received context data to a recipient mobile device, 4. The method of claim 3, wherein providing the received context data to the recipient mobile device further comprises:
associating the received context data with a component of a short message generated by a device that generated the query.

5. The method of claim 4, wherein providing the received context data to the mobile device further comprises:
appending the received context data to the short message.

6. The method of claim 5 further comprising:
forwarding the short message and the received context data to the recipient mobile device.

7. The method of claim 4, wherein providing the received context data to the mobile device further comprises:

encoding the received context data into the short message with a markup language.

8. The method of claim 1, wherein providing the request for the context data of the context-data type to the at least one context data source further comprises:
providing the request for the context data of the context-data type to a plurality of context-data sources.

9. The method of claim 1 further comprising:
storing the received context data in a database available to a recipient mobile device, 10. The method of claim 9 further comprising:
forwarding a Uniform Resource Identifier (URI) of a database server to the receiving mobile device, 11. The method of claim 9 further comprising:
appending metadata instructions to query the database for the received context data in the short message.

12. The method of claim 1, wherein the specified parameter comprises a state of the receiving mobile device.

13. The method of claim 1, wherein the specified parameter comprises a state of an available communication network.

14. The method of claim 1, wherein the specified parameter comprises a cost value of the context data as provided by the context-data source.

15. The method of claim 1, wherein the context-data type provides information about a context of the device that generated the short message.

16. The method of claim 15, wherein the mobile device that generated the short message comprises a smart phone.

17. The method of claim 1, further comprising a computer readable medium comprising computer-executable instructions adapted to perform the method of claim 1.

18. A computerized-apparatus comprising:
at least one memory having program instructions, and
at least one processor configured to execute the program instructions to perform the operations of:
receiving a short message from a mobile device;
algorithmically determining a context-data type, wherein the context-data type is determined by a meaning of a term of the short message, and wherein the context-data type provides information about an environment of the mobile device;
identifying at least one context-data source that provides the context-data type;
algorithmically ranking the at least one context data source according a specified parameter, wherein the specified parameter comprises a pecuniary cost to acquire the context data from the at least one context data source; and
generating a request for a context data of the context-data type to the at least one context data source.

19. The apparatus of claim 18, wherein the at least one processor is configured to execute the program instructions to perform the operation of rendering a context data from the at least one context-data source for communication through a communication network to a mobile device.

20. The apparatus of claim 18, wherein the at least one processor is configured to execute the program instructions to perform the operation of appending the context data from the at least one context-data source to a short message generated by the mobile device.

21. The apparatus of claim 18, wherein the at least one processor is configured to execute the program instructions to perform the operation of selecting the context-data. from a list of context-data elements weighted according to at least one metric.

22. A method comprising:
collecting a set of context-data. from at least one context-data provider with at least one server, wherein the context-data. is related to a meaning of a short message content;
algorithmically selecting a relevant context data according to a metric, wherein the metric comprises a monetary cost of the context-data, and wherein the context-data is obtained by a physical sensor;
linking the relevant context data to the short message; and
formatting the relevant context data and the short message according to a communication protocol.

23. The method of claim 22, wherein the communication protocol comprises a cellular network short message protocol.

24. The method of claim 22, wherein the communication protocol comprises an internet communication protocol.

25. The method of claim 22, wherein the at least one context-data provider is allowed to provide a cost of the context-data.

26. The method of claim 22, wherein the context data is related to a physical context of the device that generated the short message.

* * * * *